United States Patent [19]

Mikeska

[11] Patent Number: 5,069,574
[45] Date of Patent: Dec. 3, 1991

[54] CONNECTION BETWEEN TWO COMPONENTS

[75] Inventor: Felix Mikeska, Siegburg, Fed. Rep. of Germany

[73] Assignee: Jean Walterscheid GmbH

[21] Appl. No.: 439,273

[22] Filed: Nov. 20, 1989

[30] Foreign Application Priority Data

Nov. 22, 1988 [DE] Fed. Rep. of Germany ....... 3839378

[51] Int. Cl.⁵ .............................................. F16B 11/00
[52] U.S. Cl. .................................... 403/274; 403/284
[58] Field of Search ............... 403/274, 279, 278, 284, 403/280, 51, 248, 247, 265, 266, 404

[56] References Cited

U.S. PATENT DOCUMENTS

| 3,419,297 | 12/1968 | Diepenhorst et al. | 403/274 X |
|---|---|---|---|
| 3,544,143 | 12/1970 | Ohlsson | 403/265 |
| 4,025,208 | 5/1977 | Donahue | 403/284 X |
| 4,221,041 | 9/1980 | Hufnagl et al. | 403/274 X |
| 4,496,052 | 1/1985 | Nertman | 403/274 X |
| 4,597,687 | 7/1986 | Colas | 403/284 X |
| 4,626,122 | 12/1986 | Harrison et al. | 403/51 |
| 4,810,143 | 3/1989 | Muller | 403/274 X |
| 4,820,475 | 4/1989 | Mayers et al. | 403/274 X |
| 4,904,107 | 2/1990 | Fukukawa et al. | 403/274 X |

FOREIGN PATENT DOCUMENTS 250978 10/1987 Fed. Rep. of Germany .
1376270 12/1974 United Kingdom .

Primary Examiner—Peter M. Cuomo
Attorney, Agent, or Firm—Toren, McGeady & Associates

[57] ABSTRACT

A connection between two components (2, 3) comprises an extension (5) from one of the components (2) which passes through a hole (6) in the other component (3). The extension (5) is formed from a plastics material having a memory ability and has a tubular shape. The edge of extension (5) is rolled over outwardly and backwardly towards the other component (3) and contacts it. A process for connecting the two components and a tool (9) for carrying out this process are also disclosed.

4 Claims, 2 Drawing Sheets

CONNECTION BETWEEN TWO COMPONENTS

BACKGROUND TO THE INVENTION

1. Field of the Invention

The invention relates to a connection between two components as well as to a process for connecting two components and to a tool for use in such a process. The invention is particularly applicable to the connection between an adapter ring made of plastics and a protective dish of the protective covering for the rotating shafts of agricultural implements. One of the two components to be connected comprises an extension which, for fixing purposes, passes through a hole in the other component, the extension being formed from a plastics material having a memory ability, i.e. it exhibits the effect that it attempts to return to its previous form.

2. Description of Prior Art

East German Patent Specification No. 250 978 (DD 250 978 A1) describes a connection in which the memory ability of the plastics material is used for enabling the connection to be unfastened. A solid extension is deformed to form a head thereon and, to unfasten, is heated so that it returns to its previous shape.

The adapter ring of the protective covering of an agricultural implement usually serves for fixing the protective covering on a component, for example the gearbox housing from which a rotating shaft projects in the form of a shaft journal, with the protective dish and the adapter ring being joined to form one unit by means of bolts or by means of journal extensions passing through and being arranged in bores of the protective dish. With such a design it is necessary to provide additional securing means, for example in the form of bolts. However, the disadvantage of such a design is that the additional connection results in additional production expenditure.

SUMMARY OF THE INVENTION

It is therefore the object of the present invention to provide a simple connection between two components which does not require any additional connecting aids such as bolts or welds and which is free of any axial play.

The invention provides a connection between two components comprising an extension from one of the components which, for fixing purposes, passes through a hole in the other component, the extension being formed from a plastics material having a memory ability, wherein the extension has a tubular shape, projects beyond the other component, and the edge of the portion of the extension which projects beyond the component is rolled over outwardly and backwardly towards the other component and contacts it.

In a connection according to the last preceding paragraph, the turned backwardly part of the extension, which forms a bead, ensures that the component, through which the extension passes, is held in contact with the component comprising the extension. The memory ability ensures that the turned part cannot be turned back because as a result of its material properties it aims at assuming its original diameter, thereby contracting in the direction of its original diameter The extension may be formed on an adapter ring made of plastics material and the other component may be a protective dish of a protective cover for a rotating shaft of an agricultural implement.

The extension may pass through a bore in the protective dish which is supported axially against a stop face of the adapter ring.

The preferred material for the extension is polyethylene and the component from which the extension projects may be made of the same material.

To achieve the connection, the invention proposes a process wherein one of the components comprises a tubular extension formed from a plastics material having a memory ability, the process comprising passing the extension through a hole in the other component, radially expanding a portion of the extension which projects beyond the other component and rolling said portion up towards said other component.

By expanding the extension and rolling it up until it has been turned over, the turned-over edge contracts because of the memory ability and together with the component to be connected to it forms a fixed unit which cannot be unfastened without destroying it. This process can be carried out at room temperature and is independent of the material of the component to be connected.

The tool for carrying out the process in accordance with the invention comprises a pressure punch which may be moved into the extension, the pressure punch comprising a peg having an outer face which expands conically away from an introducing end thereof, the outer face passing into an annular groove in a radial face of the pressure punch.

Because of the conical peg the extension is first expanded and then turned over in the region of the annular groove so that it is rolled up.

In a preferred embodiment the groove has a base which in cross-section is curved and has a run-out face which is cylindrical.

BRIEF DESCRIPTION OF DRAWINGS

A preferred embodiment of a connection according to the invention and a tool for use in forming the connection are diagrammatically illustrated in the drawings with the help of which the process in accordance with the invention is also explained.

In the drawings:

FIG. 2 shows a detail of the protective covering showing a stage in the formation of the connection before a pressure punch has been moved in.

DESCRIPTION OF PREFERRED EMBODIMENTS

Figure 1:
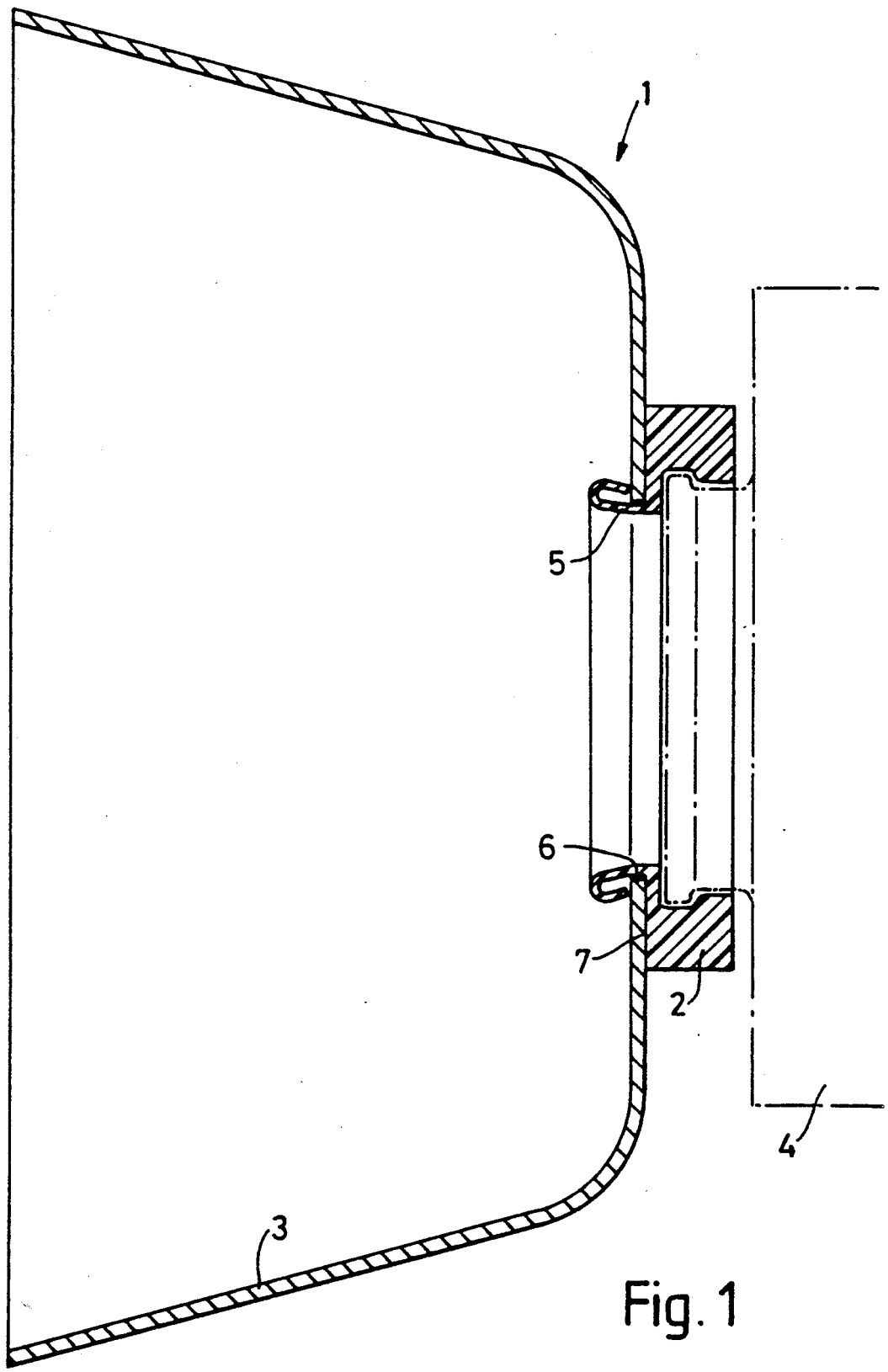
FIG. 1 is a longitudinal section of a protective covering having a connection in accordance with the invention.

FIG. 1 shows a protective covering 1 for a rotating shaft of an agricultural implement which consists of a first component in the form of an adapter ring 2 and a second component in the form of a protective dish 3. The connection between the ring 2 and the dish 3 comprises a tubular extension 5 from the ring 2 on to which the protective dish 3 is slid. The extension 5 passes through a hole 6 in the dish 3 and the dish 3 rests against and is supported axially against a stop face 7 of the adapter ring 2. The adapter ring 2 and its extension 5 are formed from a plastics material having a memory ability, specifically polyethylene. The edge of the end of the extension 5 where it projects beyond the dish 3 is turned outwardly and backwardly so that it is rolled up and contacts the inner face of the protective dish. Because of the memory ability, the end of the extension 5, after having been turned over, aims at assuming its original diameter, thereby generating an inwardly directed force holding the end of the extension in the turned-over condition.

The protective covering 1 is connected to a housing 4 of a gearbox by means of the adapter ring 2. The protective covering 1 serves to cover a rotating shaft emerging from the gearbox housing 4 so that the shaft cannot be touched unintentionally.

Figure 2:
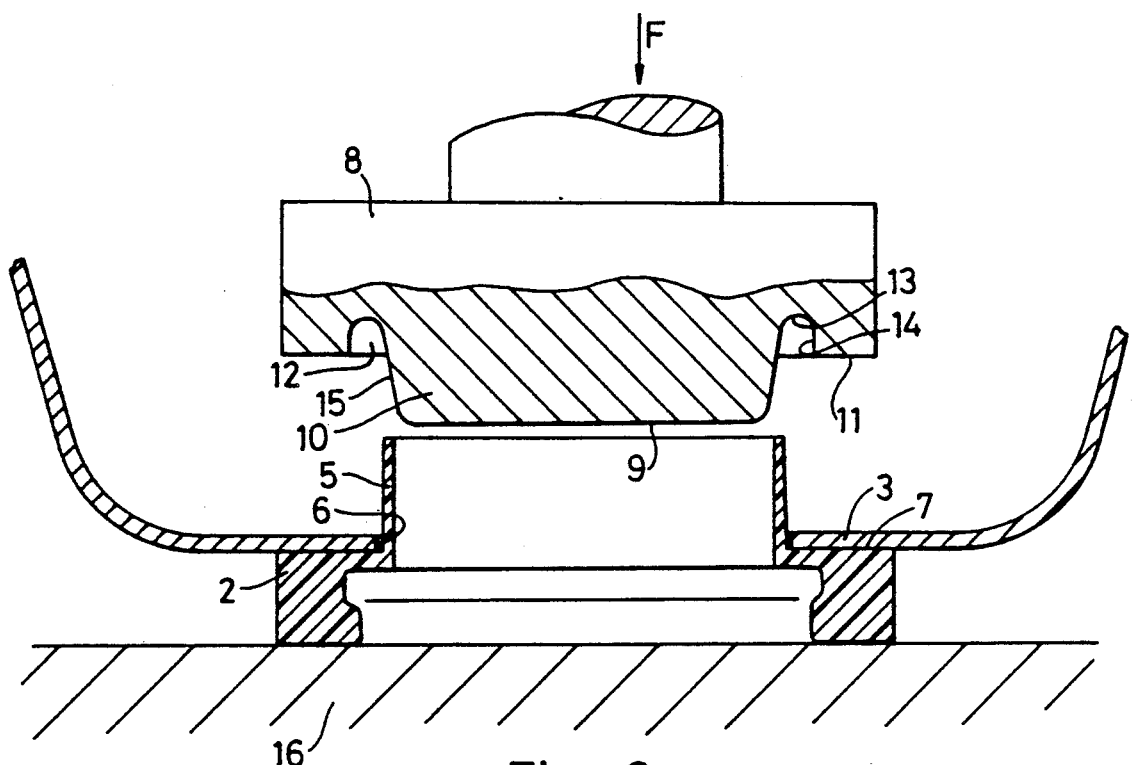
Figure 3:
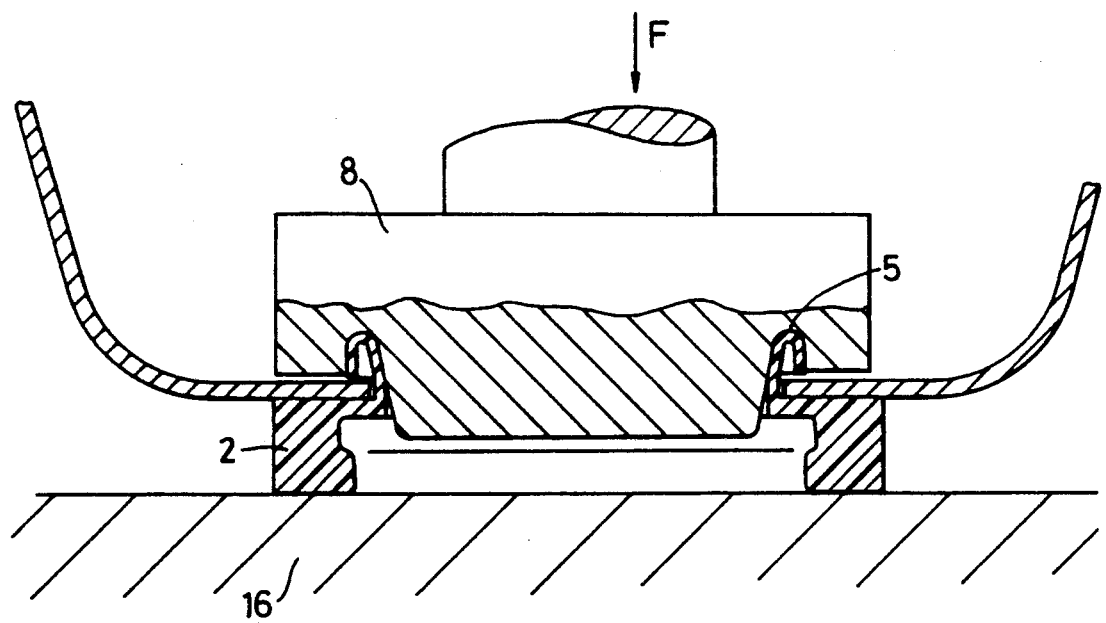
FIG. 3 is similar to FIG. 2 but shows the pressure punch moved in and the completed connection.

FIGS. 2 and 3 explain the process for connecting the two components 2 and 3 as well as the tool used in the process. As can be seen in FIG. 2, the extension 5, prior to producing the connection, is still cylindrical, with the protective dish 3, with its hole 6, resting against the stop face 7 of the adapter ring 2. It can be seen that the extension 5 is tubular. The tool which comprises a pressure punch 8 for producing the connection is in its starting position. The pressure punch comprises a peg 10 which, starting from its introducing end 9, comprises a conically expanding outer face 15 which passes into an annular groove 12 in a radial face of the punch 8. The annular groove 12 comprises a groove base 13 whose cross-section is curved, specifically bent so as to be circular-arch-shaped. The annular groove 12 is provided in a radial face 11 of the pressure punch 8. The groove base 13, in turn, runs into a run-out face 14 designed as a cylindrical face.

For producing the connection, the pressure punch 8, with its introducing end 9, is moved into the central hole of the tubular extension 5. As it moves into the extension 5, the extension is expanded, and as soon as it reaches the region of the annular groove 12, its edge is turned over along its groove base 13 until, while sliding along the run-out face 14, it is supported with its end against the inner face of the protective dish 3. Subsequently, the pressure punch 8 is withdrawn. Because of the memory ability of the plastics material selected for the adapter ring 2 and the extension 5, the end of the extension contracts. There is no possibility of the extension end unrolling itself, and a firm connection between the protective dish 3 and the adapter ring 2 is achieved. In the process of producing the connection, the adapter ring 2 is supported on a base 16 of the tool.

I claim:

1. A connection between two components comprising an extension from one of the components which, for fixing purposes, passes through a hole in the other component, the extension being formed from a plastics material having a memory ability, wherein the extension has a tubular shape, projects beyond the other component, and an end portion of the extension which projects beyond the other component is rolled over outwardly and backwardly towards the other component and contacts said other component, the end portion of said extension being biased inwardly and contracting toward said extension due to the memory ability of the plastics material.

2. A connection according to claim 1, wherein the extension is formed on an adapter ring made of plastics material and the other component is a protective dish of a protective cover for a rotating shaft of an agricultural implement.

3. A connection according to claim 2, wherein the extension passes through a bore in the protective dish which is supported axially against a stop face of the adapter ring.

4. A connection according to any one of claims 1 to 3 wherein the extension is made of polyethylene.

* * * * *